(12) United States Patent
Yamashita et al.

(10) Patent No.: US 12,009,504 B2
(45) Date of Patent: Jun. 11, 2024

(54) ELECTRODE, ELECTRODE GROUP, SECONDARY BATTERY, BATTERY PACK, AND VEHICLE

(71) Applicant: KABUSHIKI KAISHA TOSHIBA, Tokyo (JP)

(72) Inventors: Yasunobu Yamashita, Tokyo (JP); Keigo Hoshina, Yokohama Kanagawa (JP); Yasuhiro Harada, Isehara Kanagawa (JP); Norio Takami, Yokohama Kanagawa (JP); Shinsuke Matsuno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 38 days.

(21) Appl. No.: 17/186,046

(22) Filed: Feb. 26, 2021

(65) Prior Publication Data

US 2022/0085352 A1 Mar. 17, 2022

(30) Foreign Application Priority Data

Sep. 17, 2020 (JP) ................................ 2020-156032

(51) Int. Cl.
*H01M 4/36* (2006.01)
*B60L 50/64* (2019.01)
(Continued)

(52) U.S. Cl.
CPC ........... *H01M 4/362* (2013.01); *H01M 4/485* (2013.01); *H01M 4/625* (2013.01);
(Continued)

(58) Field of Classification Search
CPC ...... H01M 4/131; H01M 4/362; H01M 4/483; H01M 4/485; H01M 4/505; H01M 4/525;
(Continued)

(56) References Cited

U.S. PATENT DOCUMENTS 10,326,140 B2 6/2019 Yamashita
2013/0052534 A1* 2/2013 Fujiki ................. H01M 4/5805
429/231
(Continued)

FOREIGN PATENT DOCUMENTS

CN 104466261 A 3/2015
CN 107863549 A 3/2018
(Continued)

OTHER PUBLICATIONS

Abramoff, et al., "Image processing with ImageJ", Imaging Software, Reprinted from the Jul. 2004 issue of Biophotonics International copyrighted by Laurin Publishing Co. Inc., 7 pages.

*Primary Examiner* — Matthew T Martin
*Assistant Examiner* — Ankith R Sripathi
(74) *Attorney, Agent, or Firm* — Foley & Lardner LLP

(57) ABSTRACT

According to one embodiment, provided is an electrode including a current collector and an active material-containing layer in contact with the current collector. The active material-containing layer contains a carbon nanotube and particles of titanium-containing oxide having an average particle size or 0.1 μm to 3 μm. A peel strength between the current collector and the active material-containing layer is within a range of 0.2 kN/m to 0.7 kN/m.

13 Claims, 8 Drawing Sheets

(51) Int. Cl.
  *H01M 4/02* (2006.01)
  *H01M 4/485* (2010.01)
  *H01M 4/62* (2006.01)
  *H01M 10/0525* (2010.01)

(52) U.S. Cl.
  CPC ......... *H01M 10/0525* (2013.01); *B60L 50/64* (2019.02); *H01M 2004/021* (2013.01); *H01M 2004/027* (2013.01); *H01M 2220/20* (2013.01)

(58) Field of Classification Search
  CPC ............. H01M 4/625; H01M 10/0413; H01M 10/0431; H01M 10/05; H01M 10/052; H01M 10/0525; H01M 10/0587; H01M 10/39; H01M 2004/021; H01M 2004/027; H01M 2220/20
  See application file for complete search history.

(56) References Cited

U.S. PATENT DOCUMENTS

| | | |
|---|---|---|
| 2015/0086852 A1 | 3/2015 | Matsuno et al. |
| 2016/0276652 A1 | 9/2016 | Iwasaki |
| 2018/0083269 A1* | 3/2018 | Iwasaki .................... H01M 4/62 |
| 2018/0083283 A1 | 3/2018 | Yamashita et al. |
| 2020/0274169 A1 | 8/2020 | Kimura et al. |
| 2021/0047448 A1* | 2/2021 | Aoki ...................... H01M 4/366 |

FOREIGN PATENT DOCUMENTS

| | | |
|---|---|---|
| CN | 105552369 B | 6/2019 |
| EP | 3 300 144 A1 | 3/2018 |
| EP | 3 627 596 A1 | 3/2020 |
| JP | 2008-091054 A | 4/2008 |
| JP | 2016-177977 A | 10/2016 |
| JP | 2018-049715 A | 3/2018 |

* cited by examiner

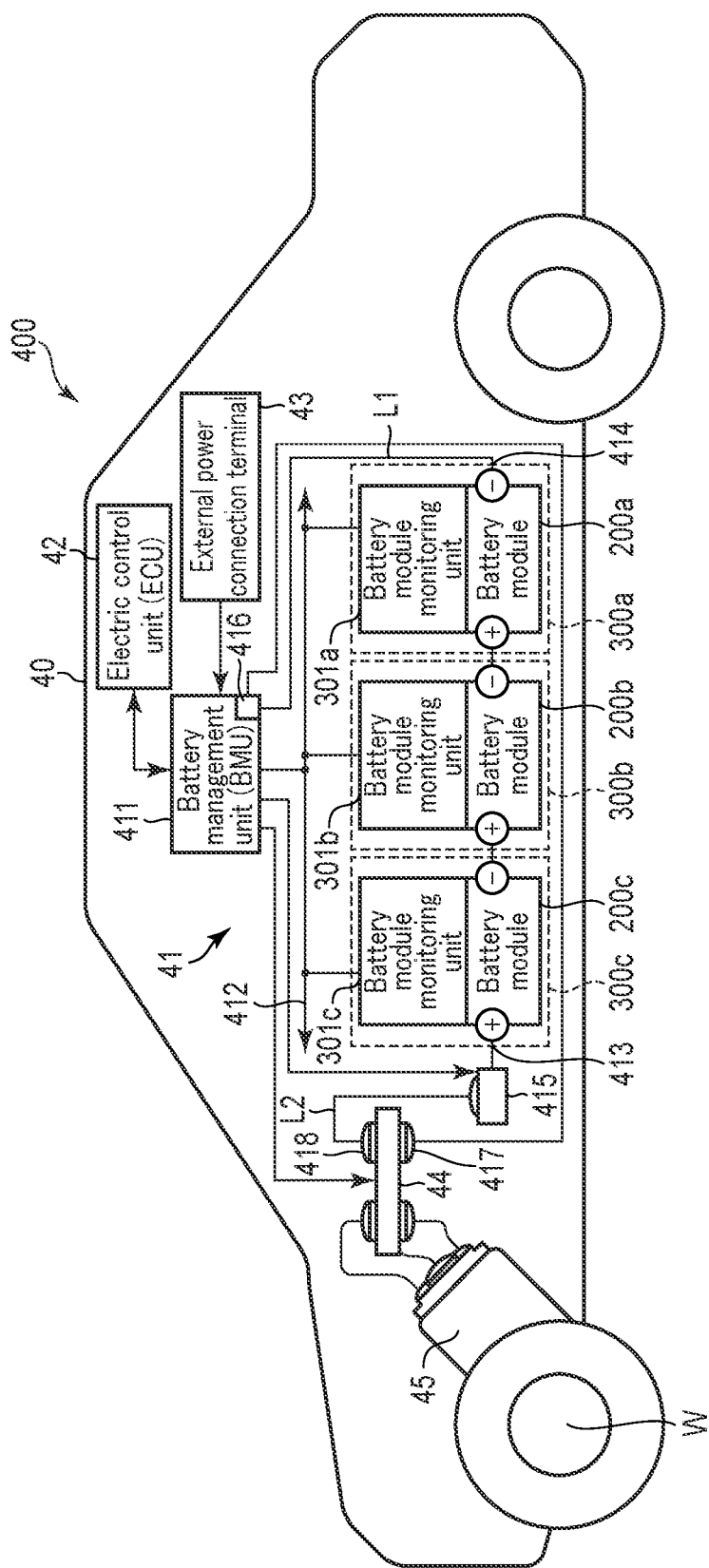
F I G. 11

ELECTRODE, ELECTRODE GROUP, SECONDARY BATTERY, BATTERY PACK, AND VEHICLE

CROSS-REFERENCE TO RELATED APPLICATIONS

This application is based upon and claims the benefit of priority from Japanese Patent Application No. 2020-156032, filed Sep. 17, 2020, the entire contents of which are incorporated herein by reference.

FIELD

Embodiments described herein relate generally to an electrode, an electrode group, a secondary battery, a battery pack, and a vehicle.

BACKGROUND

An electrode group included in a secondary battery such as a nonaqueous electrolyte battery typically has a stacked structure where electrodes are stacked or a wound structure with a wound body of an electrode housed inside an outer container. In the wound structure, there may be seen a phenomenon where the electrodes crack at an innermost bent section subjected to stress when a stiff electrode is wound. A completely cutoff electrode cannot contribute to charge and discharge, whereby a predetermined battery capacity may become unobtainable.

BRIEF DESCRIPTION OF THE DRAWINGS

FIG. 11 is a diagram schematically showing an example of a control system related to an electric system in the vehicle according to an embodiment.

DETAILED DESCRIPTION

Figure 1:
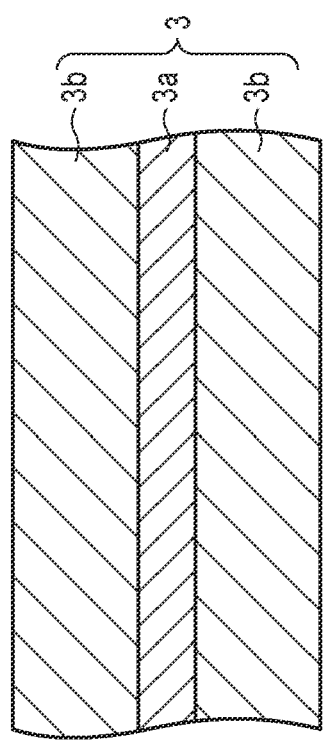
FIG. 1 is a cross-sectional view schematically showing an example of an electrode according to an embodiment.

According to one embodiment, provided is an electrode including a current collector and an active material-containing layer in contact with the current collector. The active material-containing layer contains a carbon nanotube and particles of titanium-containing oxide having an average particle size or 0.1 μm to 3 μm. A peel strength between the current collector and the active material-containing layer is within a range of 0.2 kN/m to 0.7 kN/m.

According to another embodiment, provided is an electrode group including a positive electrode and a negative electrode. The negative electrode includes the electrode according to the above embodiment. The electrode group has a wound structure of a flat shape, where a stack including the positive electrode and the negative electrode is wound in a manner where a center of the wound structure lies along a first direction. At an innermost bent section, which is positioned at innermost in the flat wound structure, and which is a foremost bent section along a winding direction from an end lying along the first direction, a part of the active material-containing layer of the negative electrode is in an unbound state with respect to the current collector.

According to a further other embodiment, provided is a secondary battery including the electrode group according to the above embodiment and an electrolyte.

According to a yet another embodiment, provided is a battery pack including the secondary battery according to the above embodiment.

According to still another embodiment, provided is a vehicle including the battery pack according to the above embodiment.

In an electrode including a composite material layer in which fine particles having a particle size of about several μm as an active material are bound with a resin component, the composite material layer tends to be stiff. Oxide-based active materials commonly used in a composite material layer of a negative electrode tend to have low electron conductivity and are preferably made into fine particles in order to reduce charge resistance. For example, a negative electrode containing a titanium-containing oxide-based active material may employ active material particles having a primary particle size of 0.1 μm to 10 μm or may employ active material secondary particles having a secondary particle size of 1 μm to 30 μm obtained by accumulating primary particles. Furthermore, in order to achieve good battery performance, active material particles preferably have a particle size of 10 μm or less. Electrodes employing active material particles with a particle size in such a range tend to be stiff.

Widely used as the structure of electrodes, is a structure where a composite material layer containing an active material, that is, an active material-containing layer is supported on an electrically conductive substrate such as a metal foil. As a method for enhancing battery performance, it is known to control a peel strength of a composite material layer with respect to a substrate such as a current collector. For example, by making a negative electrode composite material layer containing an oxide-based active material that expands and contracts due to charge and discharge have a peel strength in a range from 1.1 kN/m to 20 kN/m, thereby achieving an electrode structure with sufficient binding properties, dislodging of the composite material layer off from a current collector foil can be expected to be prevented, whereby resistance increase and the like can be suppressed. However, when an electrode having a high peel strength is employed in a wound electrode group, the electrode tends to crack easily at an inner portion of the wound body and raises concerns that the inner portion does not contribute to battery reactions.

Hereinafter, embodiments will be described with reference to the drawings. The same reference signs are applied to common components throughout the embodiments and overlapping explanations are omitted. Each drawing is a schematic view for describing the embodiment and promoting understanding thereof; though there may be differences in shape, size and ratio from those in an actual device, such specifics can be appropriately changed in design taking the following explanations and known technology into consideration.

First Embodiment

According to a first embodiment, provided is an electrode including a current collector and an active material-containing layer. The active material-containing layer is in contact with the current collector. The active material-containing layer contains particles of titanium-containing oxide and carbon nanotubes. The particles of titanium-containing oxide have an average particle size of 0.1 lam to 3 μm. A peel strength between the current collector and the active material-containing layer is within a range of 0.2 kN/m to 0.7 kN/m.

The electrode may be an electrode fora battery. An example of the electrode employed as a battery electrode includes a negative electrode for a secondary battery. Examples of the secondary battery herein include a lithium ion secondary battery and a nonaqueous electrolyte battery.

The current collector may be, for example, a strip-shaped metal foil or alloy foil.

The active material-containing layer may be formed on one face or both of reverse faces of the current collector. The active material-containing layer contains the titanium-containing oxide as an active material and the carbon nanotube as an electro-conductive agent. The active material-containing layer may further contain a binder.

In an electrode employed in an electrode group having a wound structure, portions positioned at inner sections of a wound body may be bent at an angle close to 180 degrees. In particular, when producing an electrode group having a flat wound structure, the wound body may be subjected to a pressing treatment, and upon the pressing treatment, a portion on an inner side may be bent at an angle of about 180 degrees. This may cause cracks at the inner sections of the electrode wound body, and the cracks may cause a loss of battery performance or a short circuit in the inner sections. For example, the cracking of the electrode at inner sections of the wound body may result in generation of a portion that does not contribute to charge and discharge, which may impair the actual capacity of the battery. Such failures become particularly conspicuous in a large-size battery. The electrode according to the embodiment can suppress such cracks by the above configuration.

Specifically, by having the peel strength between the current collector and the active material-containing layer be within a range from 0.2 kN/m to 0.7 kN/m, the active material-containing layer can partially peel away from the current collector at the inner sections of the wound body where the electrode is bent at an angle close to 180 degrees, which puts the active material-containing layer into an unbound state. Accordingly, the electrode locally decreases in thickness at the bent portion. Therefore, the electrode no longer breaks with an initiation point of the breakage being at a region near the outermost surface of the active material-containing layer where stress is applied most, thereby preventing the electrode from cracking at inner sections of the wound body. With a peel strength of 0.2 kN/m or more, peeling of the active material-containing layer in the electrode, including the bent portion, can be adequately suppressed, which makes it possible to prevent minute short circuits due to debris of the peeled active material-containing layer. With a peel strength kept at 0.7 kN/m or less, the aforementioned effect can be exhibited, where breakage is prevented by the active material-containing layer becoming unbound at the bent portion. It is preferable for the peel strength to be 0.3 kN/m or more.

When the active material-containing layer is disposed on both faces of the current collector, peel strengths on the both faces are made equal. For example, as long as the peel strength on the inner side facing the inside of the wound body is reduced, it is possible to prevent the cracking itself of the electrode, where the inner side serves as the point of initiation. However, in a case where the active material-containing layers on the outer face and the inner face of the current collector have different peel strengths, electrode compositions and the like are altered between each face, which causes distortion of the electrode during pressing or winding. In addition, such a configuration causes the electrode to have each side having different battery performance. In order to avoid such defects, it is desirable that both faces be designed to have the same peel strength. Specifically, the active material-containing layers on the both faces of the current collector are made uniform in design such as composition and thickness. Difference between each face on a level of margin of error stemming from manufactural circumstances are tolerable.

A peel strength of an electrode is affected by a particle size of a titanium-containing oxide and compositions of auxiliary members such as an electro-conductive agent and a binder. For example, the following tendencies are seen with changes in particle size of the titanium-containing oxide and in binder content. On one hand, as long as the surfaces of particles are covered with the binder, the finer the particles, the higher the peel strength tends to be. On the other hand, when the binder content is insufficient relative to an increase in surface area of the particles associated with making the particles fine, the peel strength decreases.

In the electrode, the titanium-containing oxide particles has an average particle size in a range from 0.1 μm to 3.0 μm. The average particle size herein represents an average diameter of secondary particles. An average particle size within this range is desirable from a viewpoint of achieving both input-output performance and life performance of the battery. Setting the average particle size to 0.1 μm or more makes it possible to maintain electro-conductive percolation between the particles even without a large amount of the electro-conductive agent, whereby the energy density can be kept high. Keeping the average particle size as small as 3.0 μm or less makes it possible to reduce cracks inside the particles when the active material expands and contracts during repetitive charge and discharge, whereby an increase in electrical resistance of the active material can be suppressed.

Compositions of the auxiliary members such as the electro-conductive agent and the binder affect the occurrence of peeling and cutting of the electrode at the bent portion. An increase in electro-conductive agent content tends to cause a decrease in peel strength. On the other hand, an increase in binder content leads to an increase in peel strength. However, it should be noted that an increase in binder content stiffens the electrode.

A peel strength of an electrode is affected not only by compositions of an active material and auxiliary members in an active material-containing layer but also by production conditions thereof. As will be described later, an electrode can be fabricated by applying, onto a current collector, a slurry in which an active material, an electro-conductive agent, a binder, and the like are dispersed in a solvent, then drying the slurry coating film. In the fabrication of an electrode, the faster the slurry dries, the lower the peel strength tends to be due to migration of the binder at the time of drying. Accordingly, a higher drying temperature tends to cause a lower peel strength.

The active material-containing layer contains a titanium-containing oxide as an active material. As the active material, a titanium-containing oxide may be contained alone, or two or more species of titanium-containing oxides may be contained. Further, there may be contained a mixture where one species or two or more species of titanium-containing oxides are further mixed with one species or two or more species of another active material.

Examples of titanium-containing oxides include lithium titanate having a ramsdellite structure (e.g., $Li_{2+y}Ti_3O_7$, $0 \leq y \leq 3$), lithium titanate having a spinel structure (e.g., $Li_{4+x}Ti_5O_{12}$, $0 \leq x \leq 3$), monoclinic titanium dioxide ($TiO_2$) anatase titanium dioxide, rutile titanium dioxide, a hollandite titanium composite oxide, an orthorhombic titanium composite oxide, and monoclinic niobium-titanium composite oxide.

Examples of the orthorhombic titanium-containing composite oxide include a compound represented by $Li_{2+a}M\alpha_{2-b}Ti_{6-c}M\beta_dO_{14+\sigma}$. Here, $M\alpha$ is at least one selected from the group consisting of Sr, Ba, Ca, Mg, Na, Cs, Rb and K. $M\beta$ is at least one selected from the group consisting of Zr, Sn, V, Nb, Ta, Mo, W, Y, Fe, Co, Cr, Mn, Ni and Al. The respective subscripts in the compositional formula are specified as follows: $0 \leq a \leq 6$, $0 \leq b < 2$, $0 \leq c < 6$, $0 \leq d < 6$, and $-0.5 \leq \sigma \leq 0.5$.

A specific example of the orthorhombic titanium-containing composite oxide includes an orthorhombic Na-containing niobium-titanium composite oxide represented by general formula $Li_{2+a}Na_{2-v}M\alpha'_wTi_{6-c'-d'}Nb_{c'}M\beta'_dO_{14+\sigma}$. Here, $M\alpha'$ is one or more selected from the group consisting of Cs, K, Sr, Ba and Ca. $M\beta'$ is one or more selected from the group consisting of Zr, Sn, V, Ta, Mo, W, Fe, Co, Mn and Al. In the compositional formula, the respective subscripts are $0 \leq a' \leq 4$, $0 < v < 2$, $0 \leq w < 2$, $0 < c' < 6$, $0 \leq d' < 3$, $c'+d' < 6$, and $-0.5 \leq \sigma \leq 0.5$. A more specific example includes $Li_{2+a}Na_2Ti_6O_{14}$ ($0 \leq a \leq 6$).

An example of the monoclinic niobium-titanium composite oxide is a compound represented by $Li_xTi_{1-y}M1_{y+z}Nb_{2-z}O_{7-\delta}$. Here, M1 is at least one selected from the group consisting of Mg, Fe, Ni, Co, W, Ta, and Mo. The respective subscripts in the composition formula are specified as follows: $0 \leq x \leq 5$, $0 \leq y < 1$, $0 \leq z < 2$, and $-0.3 \leq \delta \leq 0.3$.

Another example of the monoclinic niobium-titanium composite oxide includes a compound represented by $Li_xTi_{1-y}M2_yNb_{2-z}M3_zO_{7+\delta}$. Here, M2 is at least one selected from the group consisting of Zr, Si, and Sn. $M\beta$ is at least one selected from the group consisting of V, Ta, and Bi. The respective subscripts in the composition formula are specified as follows: $0 \leq x \leq 5$, $0 \leq y < 1$, $0 \leq z < 2$, and $-0.3 \leq \delta \leq 0.3$. A specific example of the monoclinic niobium-titanium composite oxide includes $Li_xNb_2TiO_7$ ($0 \leq x \leq 5$).

Specific examples of the monoclinic niobium titanium composite oxide include $Nb_2TiO_7$, $Nb_2Ti_2O_9$, $Nb_{10}Ti_2O_{29}$, $Nb_{14}TiO_{37}$, and $Nb_{24}TiO_{62}$. The monoclinic niobium titanium composite oxide may be a substituted niobium titanium composite oxide in which at least part of Nb and/or Ti is substituted with a dopant element. Examples of the substituent element include Na, K, Ca, Co, Ni, Si, P, V, Cr, Mo, Ta, Zr, Mn, Fe, Mg, B, Pb, and Al. The substituted niobium titanium composite oxide may contain one species of substituent element or two or more species of substituent elements.

The electro-conductive agent is blended in order to enhance the current collecting performance and to suppress contact resistance between the active material and the current collector. The active material-containing layer contains a carbon nanotube as the electro-conductive agent. Examples of the carbon nanotube include a single-walled carbon nanotube (SWCNT) and a multi-walled carbon nanotube (MWCNT). The single-walled or multi-walled carbon nanotube as the electro-conductive agent suppresses powder-falling when the electrode is bent. Accordingly, it is possible to prevent excessive peeling of the active material-containing layer at inner sections of the wound electrode group.

The active material-containing layer may include other electro-conductive agents together with the carbon nanotube(s). Examples of other electro-conductive agents include carbonaceous substances such as vapor grown carbon fiber (VGCF), carbon blacks such as acetylene black (AB), and graphite. One of these may be used as the other electro-conductive agent, or two or more may be used in combination as the other electro-conductive agents. Alternatively, instead of using the other electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluoro-rubber, styrene-butadiene rubber (SBR), polyacrylate compounds, imide compounds, carboxymethyl cellulose (CMC), and salts of CMC. One of these may be used as the binder, or alternatively, two or more may be used in combination as the binder.

The blending portions of the active material, electro-conductive agent, and binder in the active material-containing layer may be appropriately changed according to the use of the electrode, but for example, the following blending proportion may be adopted. The active material-containing layer preferably contains the active material, electro-conductive agent, and binder in proportions of 70% by mass to 96% by mass, 2% by mass to 28% by mass, and 2% by mass to 10% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 28% by mass and 10% by mass, respectively, in view of increasing the capacity.

Furthermore, by making the content of electro-conductive agent adequately little, it is possible to prevent excessive peeling of the active material-containing layer near the bent portion. With regard to the binder, by making the content adequately little, it is possible to avoid the electrode from stiffening and to avoid being unable to release stress at the time of bending due to excessive binding to the current collector, which lead to cutting of the electrode.

There may be used for the current collector, a material which is electrochemically stable at the potential at which lithium (Li) is inserted into and extracted from the active material. The potential at which lithium (Li) inserted into and extracted from the active material is, for example, a potential higher (more noble) than 1.0 V (vs. $Li/Li^+$). For example, in the case where the electrode according to the embodiment serves as a negative electrode, the current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion, where the active material-containing layer is not formed on a surface thereof nor overlapped with the active material-containing layer that is in an unbound state. This portion may serve as a current collecting tab.

It is preferable for the active material-containing layer (excluding the current collector) to have a density in a range from 2.0 $g/cm^3$ to 3.0 $g/cm^3$. The density of the active material-containing layer may also be referred to as electrode density. With an electrode density within this range, the active material particles and the electro-conductive agent appropriately adhere to each other, which achieves a good balance between the formation of an electron conductive path in the electrode and ability of having liquid electrolyte be permeated. Accordingly, rapid charge-discharge performance and life performance are enhanced. The higher the electrode density, the stiffer the electrode tends to be. Therefore, from a viewpoint of avoiding cutting of the electrode at the bent section of the wound body, it is preferable that the electrode density is not be too high.

The electrode may be fabricated by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be fabricated in this manner.

When drying the slurry, the drying speed and drying temperature are adjusted to control the peel strength between the current collector and the active material-containing layer. As described above, when the slurry dries fast, the peel strength may decrease due to migration of the binder at the time of drying. For this reason, take note that the drying temperature should not be set too high. In contrast, too low a drying temperature raises concerns that the smoothness of surface of the electrode may be impaired and an amount of residual solvent may increase. Therefore, the drying temperature is appropriately set according to the solvent used for the slurry.

The electrode density can be controlled by adjusting pressing conditions.

<Measurement Method>

Hereinafter, various methods for measuring an electrode will be described. Specifically, described are a method for measuring a peel strength between a current collector and an active material-containing layer of an electrode and a method for examining an active material contained in the electrode.

When an electrode to be measured is assembled inside a secondary battery, the electrode can be taken out, for example, by disassembling the battery in the following manner and used as a measurement sample.

First, the battery is completely discharged, and then, disassembled in an inert atmosphere. After that, an electrode group is taken out, and an electrode is cut out in a predetermined size. The taken-out electrode is washed with a nonaqueous solvent to remove an electrolyte remaining in the electrode, and then, dried under reduced pressure, thereby preparing a sample. Examples of the nonaqueous solvent include linear carbonates such as diethyl carbonate and methyl ethyl carbonate, and cyclic carbonates such as propylene carbonate and ethylene carbonate.

(Measurement of Peel Strength)

The measurement of the peel strength can be performed by a surface/interface cutting method using a cutting strength measurement device such as a surface and interfacial cutting analysis system (SAICAS) (registered trademark). Note, the surface/interface cutting method may also be referred to as the SAICAS method.

As the measurement device, for example, DN-GS from DAYPLA WINTES CO., LTD., may be used. As a cutting knife, for example, a ceramic knife made of borazon and having a knife width of 2.0 mm is used.

Measurement conditions are set as follows. The knife angle is set to a rake angle of 20 degrees and a clearance angle of 10 degrees. Cutting in a vertical direction is performed with a vertical load of 1N until the interface between the current collector and the active material-containing layer is reached. Thereafter, the cutting in the vertical direction is stopped and cutting is performed in a horizontal direction at a horizontal speed of 2 μm/second. The horizontal force (load in the horizontal direction) required to keep this horizontal speed is measured, whereby the peel strength is obtained.

(Method of Examining Active Material)

Using the electrode obtained by the above-described procedure as a sample, the composition of active material included in the active material-containing layer can be examined by combining elemental analysis with a scanning electron microscope equipped with an energy dispersive X-ray spectrometry scanning apparatus (scanning electron microscope-energy dispersive X-ray spectrometry; SEM-EDX), X-ray diffraction (XRD) measurement, and inductively coupled plasma (ICP) emission spectrometry. By SEM-EDX analysis, shapes of components contained in the active material-containing layer and compositions of the components contained in the active material-containing layer (each element from B to U in the periodic table) can be known. Elements within the active material-containing layer can be quantified by ICP measurement. Crystal structures of materials included in the active material-containing layer can be examined by XRD measurement.

A cross-section of the electrode taken out as described above is cut out by Ar ion milling. The cut out cross-section is observed with the SEM. Sampling is also performed in an inert atmosphere such as argon or nitrogen to avoid exposure to the air. Several particles are selected from SEM images at 3000-fold magnification. Here, particles are selected such that a particle diameter distribution of the selected particles becomes as wide as possible.

Next, elemental analysis is performed on each selected particle by EDX. Accordingly, it is possible to specify identity and quantities of elements other than Li among the elements contained in each selected particle.

With regard to Li, information regarding the Li content in the entire active material can be obtained by ICP emission spectrometry. ICP emission spectrometry is performed according to the following procedure.

From the dried electrode, a powder sample is prepared in the following manner. The active material-containing layer is dislodged from the current collector and ground in a mortar. The ground sample is dissolved with acid to prepare a liquid sample. Here, hydrochloric acid, nitric acid, sulfuric acid, hydrogen fluoride, and the like may be used as the acid.

The concentration of elements included in the active material being measured can be found by subjecting the liquid sample to ICP analysis.

Crystal structure(s) of compound(s) included in each of the particles selected by SEM can be specified by XRD measurement. XRD measurement is performed within a measurement range where 2θ is from 5 degrees to 90 degrees, using CuKα ray as a radiation source. By this measurement, X-ray diffraction patterns of compounds contained in the selected particles can be obtained.

As an apparatus for XRD measurement, SmartLab manufactured by Rigaku can be used. Measurement is performed under the following conditions:

X ray source: Cu target
Output: 45 kV, 200 mA
soller slit: 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: range of 5°≤2θ≤90°

When another apparatus is used, measurement using a standard Si powder for powder X-ray diffraction is performed to seek conditions at which measurement results of peak intensities, half-widths, and diffraction angles are equivalent to results obtained by the above apparatus, and measurement is conducted at those conditions.

Conditions of the XRD measurement is set, such that an XRD pattern applicable to Rietveld analysis is obtained. In order to collect data for Rietveld analysis, specifically, the step width is made ⅓ to ⅕ of the minimum half width of the diffraction peaks, and the measurement time or X-ray intensity is appropriately adjusted in such a manner that the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. Here, estimation of the crystal structure model is performed based on analysis results of EDX and ICP. The parameters of the crystal structure (lattice constant, atomic coordinate, occupancy ratio, or the like) can be precisely analyzed by fitting all the calculated values with the measured values.

XRD measurement can be performed with the electrode sample directly attached onto a glass holder of a wide-angle X-ray diffraction apparatus. At this time, an XRD spectrum is measured in advance in accordance with the species of metal foil of the electrode current collector, and the position(s) of appearance of the peak(s) derived from the collector is grasped. In addition, the presence/absence of peak(s) of mixed substances such as an electro-conductive agent or a binder is also grasped in advance. If the peak (s) of the current collector overlaps the peak(s) of the active material, it is desirable to perform measurement with the active material-containing layer removed from the current collector. This is in order to separate the overlapping peaks when quantitatively measuring the peak intensities. If the overlapping peaks has been grasped beforehand, the above operations can be omitted, of course.

The aforementioned electrode will be described specifically with reference to the drawings. As a specific example of the electrode, FIG. 1 shows an aspect of a negative electrode. FIG. 1 is a cross-sectional view schematically showing an example of the electrode according to the embodiment.

A negative electrode 3 shown in FIG. 1 includes a negative electrode current collector 3a and negative electrode active material-containing layers 3b formed on both sides of the negative electrode current collector 3a.

Although both ends are not shown in FIG. 1, the negative electrode current collector 3a may be, for example, a strip-shaped metal or alloy foil.

The negative electrode active material-containing layers 3b are supported on the negative electrode current collector 3a. In the illustrated example, the negative electrode active material-containing layers 3b are supported on both principal surfaces of the negative electrode current collector 3a on front and reverse sides, but it is also feasible to have a negative electrode active material-containing layer 3b supported on just one principal surface of the negative electrode current collector 3a.

The negative electrode current collector 3a may include a part (not shown) that does not support the negative electrode active material-containing layer 3b on either surface, that is, a negative electrode current collecting tab.

The electrode according to a first embodiment includes a current collector and an active material-containing layer. The active material-containing layer is in contact with the current collector, and contains carbon nanotubes and particles of titanium-containing oxide having an average particle size or 0.1 μm to 3 μm. A peel strength of the active material-containing layer with respect to the current collector is within a range of 0.2 kN/m to 0.7 kN/m. The electrode can suppress cracks at inner sections of a wound electrode group. Accordingly, it is possible to prevent failures caused by cracks at inner sections, thereby allowing the true battery performance to be exhibited, providing improved capacity for the secondary battery provided with the wound electrode group.

Second Embodiment

According to a second embodiment, provided is an electrode group including a positive electrode and a negative electrode. The negative electrode includes the electrode according to the first embodiment. The electrode group has a wound structure of a flat shape, where a stack including the positive electrode and the negative electrode is wound in a manner where a center of the wound structure lies along a first direction. At an innermost bent section in the wound structure, a part of the active material-containing layer of the negative electrode is in an unbound state with respect to the current collector. The innermost bent section is positioned innermost in the wound structure, and is a foremost bent section along a winding direction from an end lying along the first direction.

The electrode group may be an electrode group for a battery. An example of the battery herein includes a secondary battery such as lithium ion secondary battery and non-aqueous electrolyte battery. Such an electrode group ensures the capacity of the secondary battery.

The electrode group includes one or more positive electrodes and one or more negative electrodes.

The electrode group may further include a separator disposed between the positive electrode(s) and the negative electrode(s). The electrode group may include one or more separators.

Figure 2:
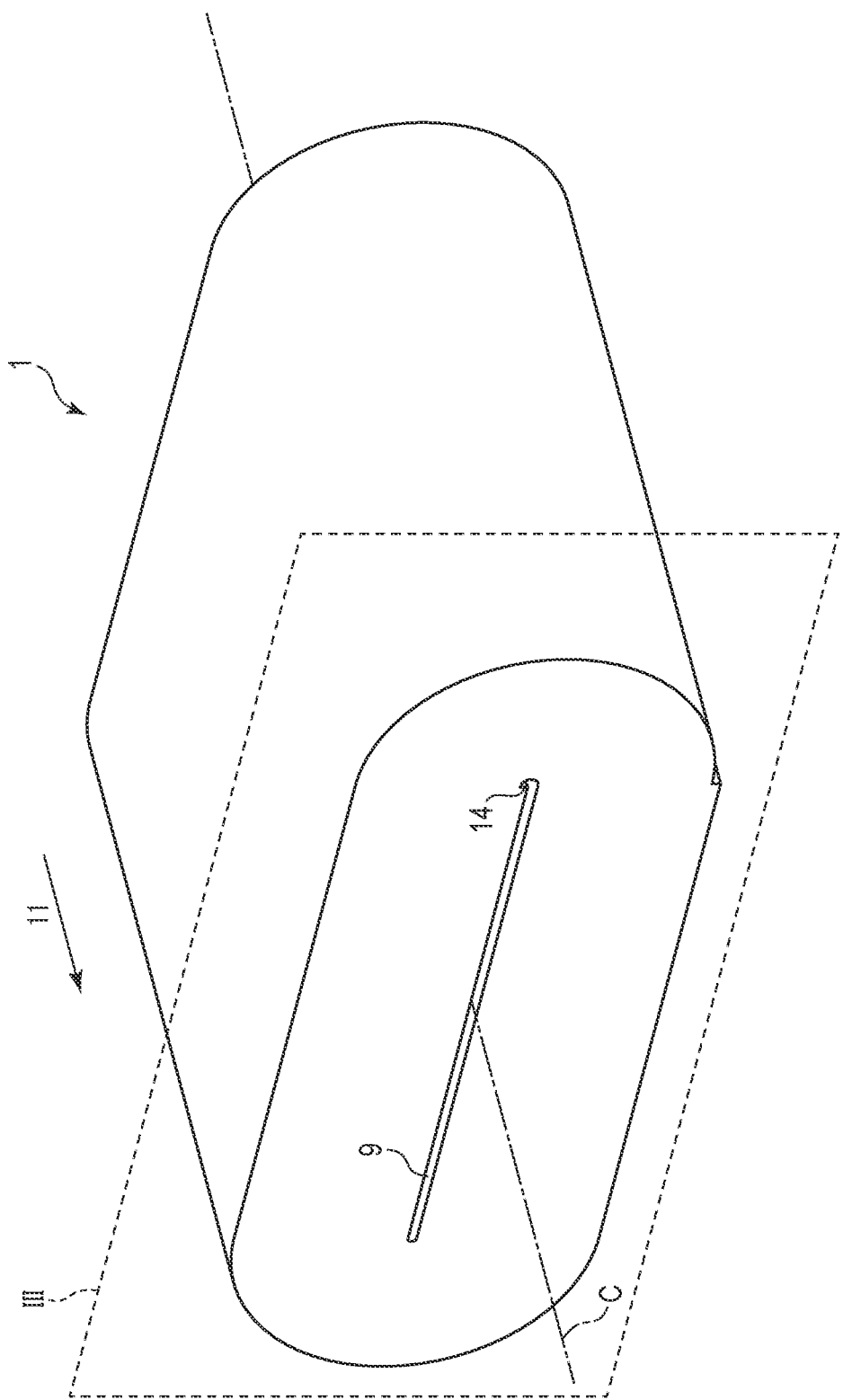
FIG. 2 is a cross-sectional view schematically showing an example of an electrode group according to an embodiment.
Figure 3:
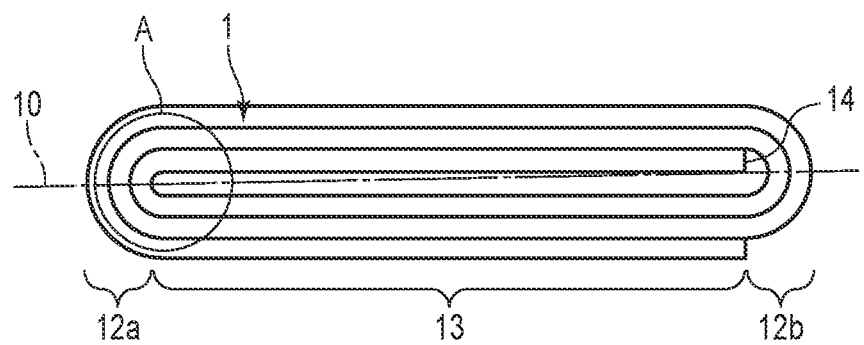
FIG. 3 is a schematic cross-sectional view along virtual plane III in FIG. 2.
Figure 4:
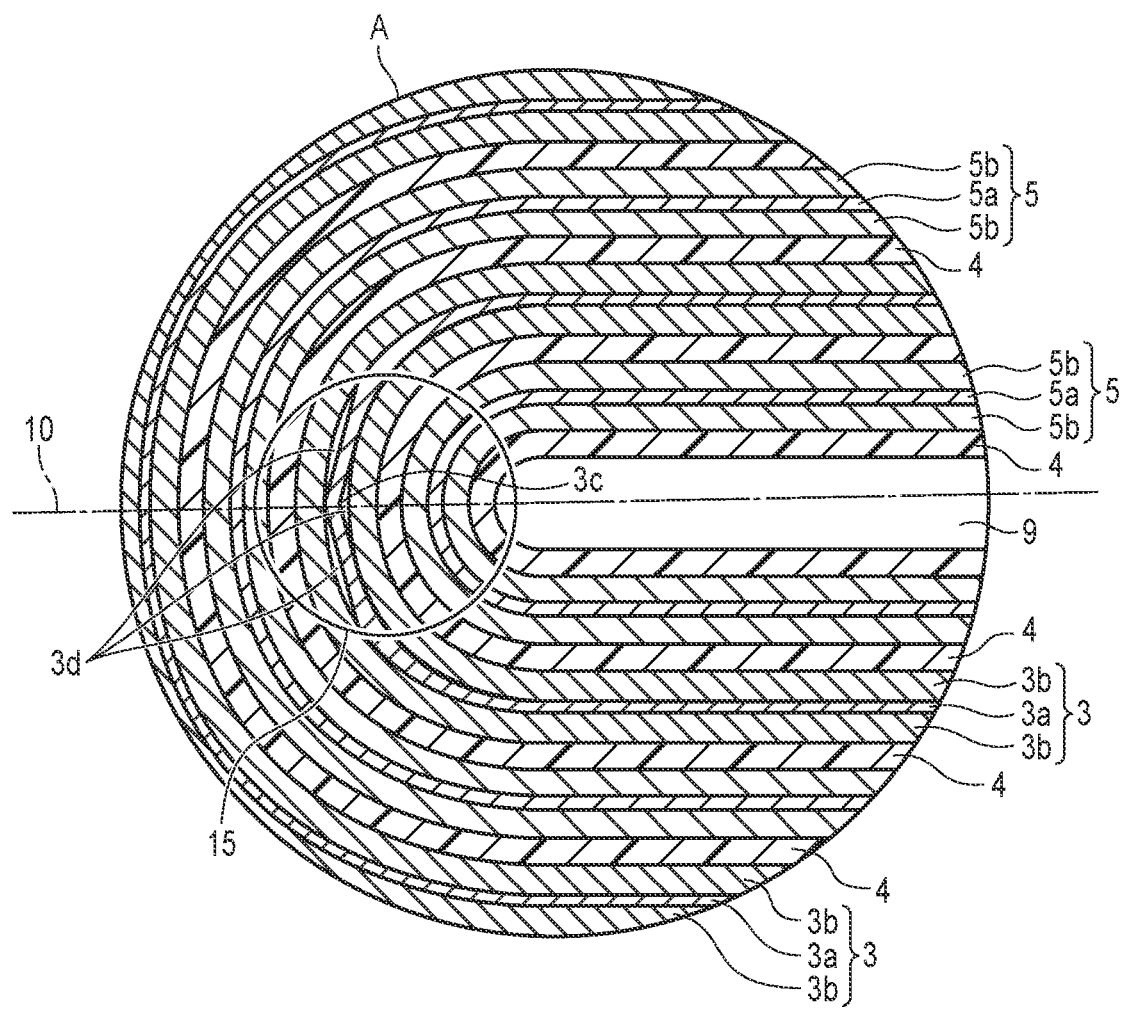
FIG. 4 is an enlarged cross-sectional view of section A of the electrode group shown in FIG. 3.

With reference to FIGS. 2 to 4, the electrode group according to the embodiment will be described. FIG. 2 is a cross-sectional view schematically showing an example of the electrode group according to the embodiment. FIG. 3 is a schematic cross-sectional view taken along virtual plane III shown in FIG. 2. FIG. 4 is an enlarged cross-sectional view of section A of the electrode group shown in FIG. 3.

As shown in FIG. 2, an electrode group 1 has a wound structure in a flat shape, in which the electrode group is wound around a virtual winding axis C along a first direction 11. Furthermore, in the wound structure, as shown in FIGS. 3 and 4, a stack including the negative electrode 3, a positive electrode 5, and a separator 4 provided between the negative electrode 3 and the positive electrode 5 is wound in a flat shape. Each of the negative electrode 3, the positive electrode 5, and the separator 4 are wound several times and are arranged repeatedly inside the electrode group 1 in the order of negative electrode 3, separator 4, positive electrode 5, separator 4, negative electrode 3, separator 4, positive electrode 5, and separator 4. A space 9 is present around the winding axis C. The wound structure in the illustrated example includes the space 9 in the center, but the electrode group 1 may also have a structure without the space 9.

The negative electrode 3 includes a negative electrode current collector 3a and negative electrode active material-containing layers 3b arranged on both faces of the negative electrode current collector 3a. The positive electrode 5 includes a positive electrode current collector 5a and positive electrode active material-containing layers 5b formed on both faces of the positive electrode current collector 5a.

FIG. 3 shows a winding cross-section of the electrode group 1 perpendicular to the first direction 11. Dashed-dotted line 10 shown in FIG. 3 indicates a position along which the longest straight line from one end to the other end of the electrode group 1 lies in this winding cross section. The electrode group 1 includes a first curved section 12a and a second curved section 12b at both ends along the longest straight line. In each curved surface, the negative electrode 3, the separator 4, and the positive electrode 5 are bent into a curved shape. Between the curved surfaces, the electrode group 1 includes a flat section 13 where the negative electrode 3, the separator 4, and the positive electrode 5 are flat or substantially flat. In the first curved section 12a and the second curved section 12b, the negative electrode 3, the separator 4, and the positive electrode 5 each include a plurality of bent sections.

FIG. 4 is an enlarged cross-sectional view showing a part of the first curved section 12a in the electrode group 1, including an innermost bent section 15 and the periphery thereof. The innermost bent section 15 is the foremost bent section in the winding direction starting from an end 14 positioned innermost in the wound structure of the electrode group 1. The innermost end 14 herein is an end that lies along the first direction 11 with regard to the stack included in the electrode group 1, which includes the negative electrode 3, the separator 4, and the positive electrode 5. The end 14 is also the end of the stack on the inner side of the wound structure, where the wound structure begins winding from. As shown in the figure, in the negative electrode 3, the negative electrode active material-containing layers 3b are partially unbound from the negative electrode current collector 3a at portions in the innermost bent section 15. In other words, in the innermost bent section 15, the negative electrode active material-containing layers 3b are peeled away from the negative electrode current collector 3a. Furthermore, in the innermost bent section 15, a fold 3c is formed along the first direction 11 on the negative electrode current collector 3a. In the illustrated example, interspaces 3d are formed between the negative electrode current collector 3a and the negative electrode active material-containing layers 3b, but such interspaces 3d need not be provided. For example, at portions included in the innermost bent section 15 of the negative electrode 3, surfaces of the negative electrode current collector 3a and the negative electrode active material-containing layers 3b may be in contact with each other while being in unbound state. The fold 3c on the negative electrode current collector 3a is not necessarily formed.

In the electrode group 1, an unbound ratio of the negative electrode active material-containing layer 3b in the innermost bent section 15 is desirably 1% or more and 20% or less per unit area. In other words, at the portions in the innermost bent section 15 of the negative electrode 3, the negative electrode active material-containing layers 3b is not bound to the negative electrode current collector 3a, for a part corresponding to 1% to 20% per unit area of the negative electrode 3. The unbound ratio of the negative electrode active material-containing layer 3b represents the degree of peeling of the negative electrode active material-containing layer 3b from the negative electrode current collector 3a.

In the electrode group 1, the negative electrode current collector 3a and the negative electrode active material-containing layers 3b are not bound to each other in the innermost bent section 15. Accordingly, stress does not concentrate at this section. This makes it possible to prevent cuts, cracks, and breaks of the negative electrode 3. For example, when an electrode, including the negative electrode 3, is cut inside a wound structure, the cutting leads to a presence of a portion that does not contribute to charge and discharge, but such a defect is avoidable by preventing the cutting of the electrode. Accordingly, a secondary battery provided with the electrode group 1 enables reduction of defects such as a decrease in capacity.

Hereinafter, the negative electrode, the positive electrode, and the separator will be described in detail.

(1) Negative Electrode

The negative electrode may include a negative electrode current collector and a negative electrode active material-containing layer. The negative electrode current collector and the negative electrode active material-containing layer may respectively be the current collector and active material-containing layer that may be included in the electrode according to the first embodiment.

In other words, the electrode group includes the electrode according to the first embodiment as the negative electrode. The negative electrode may be, for example, the electrode described in the first embodiment. The active material-containing layer included in this electrode may be a negative electrode active material-containing layer. The active material contained in the electrode may be a negative electrode active material.

When the electrode group includes plural negative electrodes, one or more of the plural negative electrodes is the electrode according to the first embodiment. For example, all the negative electrodes may be the electrode according to the first embodiment. Alternatively, one of the plural negative electrodes may be the electrode according to the first embodiment. Among the plural negative electrodes, the negative electrodes for which at least a part thereof are positioned innermost in the wound structure of the electrode group is desirably the electrode according to the first embodiment.

Details of the negative electrode overlap with the details described in the first embodiment, and are thus omitted.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$ $0<y\leq1$, $Li_xCoPO_4$; $0<x\leq1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When an ambient temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with ambient temperature molten salts, cycle life can be improved. Details regarding the ambient temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge-discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluororubber, polyacrylate compounds, imide compounds, carboxymethyl cellulose (CMC), and salts of CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The positive electrode may be fabricated by the following method, for example. First, active material (positive electrode active material), electro-conductive agent, and binder are suspended in a solvent to prepare a slurry. The slurry is applied onto one surface or both of reverse surfaces of a current collector. Next, the applied slurry is dried to form a layered stack of active material-containing layer(s) and current collector. Then, the layered stack is subjected to pressing. The positive electrode can be fabricated in this manner.

Alternatively, the positive electrode may also be fabricated by the following method. First, active material (positive electrode active material), electro-conductive agent, and binder are mixed to obtain a mixture. Next, the mixture is formed into pellets. Then the positive electrode can be obtained by arranging the pellets on the current collector.

(3) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

<Measurement Method>

Hereinafter, various methods for measuring an electrode group will be described. Specifically, described are a method for measuring an unbound ratio of an active material-containing layer to a current collector in an electrode included in an electrode group, and a method for measuring an effective electrode area ratio of the electrode.

When an electrode group to be measured is assembled within a secondary battery, the electrode group is taken out by disassembling the battery in the following manner or the like and used as a measurement sample.

First, the battery is completely discharged, and then, disassembled in an inert atmosphere. After that, the electrode group is taken out. The taken-out electrode group is washed with a nonaqueous solvent to remove any electrolyte remaining in the electrode, and then, dried under reduced pressure, thereby preparing a sample. Alternatively, depending on the measurement to be carried out, the electrode is cut out from the electrode group into a predetermined size and washed with a nonaqueous solvent to remove any electrolyte remaining in the electrode, followed by drying the electrode under reduced pressure, to prepare a sample. Examples of the nonaqueous solvent include linear carbonates such as diethyl carbonate and methyl ethyl carbonate, and cyclic carbonates such as propylene carbonate and ethylene carbonate.

(Measurement of Unbound Ratio)

The following measurement method enables quantification of an unbound ratio of an active material-containing layer to a current collector at an innermost bent section of an electrode group.

From the electrode group taken out by disassembling the battery, an electrode is cut out into a square having a width of 5 cm and a height of 5 cm centered on a bent portion. The cut electrode piece is subjected to solvent washing and vacuum drying. Then, the electrode piece is pressed under a load of 20 kN for 30 seconds, and a portion of the active material-containing layer unbound to the current collector is blown off with a blower to obtain a flat sample.

An unbound ratio is calculated by binary analysis on image data of the obtained flat sample. A portion to be measured corresponds to an area having a width of 1 cm and a height of 5 cm centered on the bent portion in the wound structure. Herein, the direction of "height of 5 cm" of the portion to be measured is aligned with a direction of the sample which had lain along the first direction (winding axis direction) when wound. For the binarization, image analysis software such as Image J (Dr. Michael et al., Image Processing with ImageJ, Reprinted from the July 2004 issue of Biophotonics International copyrighted by Laurin Publishing Co. INC.) may be employed, for example. Note that the image data is preferably acquired under conditions where the contrast between the substrate current collector and the active material-containing layer can be observed clearly. Using Image J, the image data is binarized setting a median value of the hue peak derived from the substrate and the active material-containing layer as a threshold. In the obtained binarized image, an area ratio of a portion where the active material-containing layer is unbound to the total area of the binarized region is calculated and used as an unbound ratio. Since the portion of the active material-containing layer not bound to the current collector is blown off by the blower, the current collector is exposed at the unbound portion of the active material-containing layer. When the electrode is a double-side coated electrode, the measurement is performed on both sides, and an average value of the both sides is regarded as an unbound ratio.

The image analysis software Image J is software in the public domain. The version of Image J used herein is 1.52a.

<Effective Electrode Area Ratio>

For the portion which does not contribute to charge and discharge that may arise due to cutting of an electrode or inclusion of an unbound portion of an active material-containing layer in inner sections of a wound electrode group, a proportion thereof can be determined as an effective electrode area ratio in the following manner.

First, a battery is disassembled to take out an electrode group, and then, the electrode group is washed, dried under reduced pressure, and unwound. A length of an insulated portion of an electrode included in the electrode group is determined. Specifically, a portion that is physically cut and has no electrical conductivity is determined as the insulated portion, and an electrode length thereof is determined as the insulated electrode length. The insulated electrode length and the total electrode length are measured, and based on a ratio between those lengths, an effective electrode area ratio is calculated. Here, the length of the electrode to be measured is, for example, a length that had lain along the winding direction when the electrode was wound, that is, a length intersecting the first direction.

The electrode group according to the second embodiment includes a positive electrode and a negative electrode, and has a wound structure in flat shape configured by having a stack including the positive electrode and the negative electrode wound in such a manner that a center of the wound structure is positioned along a first direction. The negative electrode includes the electrode according to the first embodiment as the negative electrode. At an innermost bent section in the flat wound structure, the active material-containing layer of the negative electrode is partially peeled from the current collector, and is in an unbound state with respect to the current collector. The innermost bent section herein is a foremost bent section along a winding direction from an end positioned innermost in the wound structure. The end positioned innermost is an end lying along the first direction. The electrode can provide a secondary battery with improved capacity.

Third Embodiment

According to a third embodiment, provided is a secondary battery including an electrode group and an electrolyte. The electrode included in the secondary battery is the electrode according to the second embodiment. The electrolyte may be held in the electrode group.

The secondary battery according to the third embodiment may further include a container member that houses the electrode group and the electrolyte.

Furthermore, the secondary battery according to the third embodiment may further include a negative electrode terminal electrically connected to the negative electrode and a positive electrode terminal electrically connected to the positive electrode.

The secondary battery according to the third embodiment may be, for example, a lithium secondary battery. Moreover, the secondary battery includes a nonaqueous electrolyte secondary battery including a nonaqueous electrolyte.

Hereinafter, the electrolyte, the container member, the negative electrode terminal, and the positive electrode terminal will be described in detail.

I. Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, an ambient temperature molten salt (ionic melt) including lithium ions, a polymer solid electrolyte, an inorganic solid electrolyte, or the like may be used as the nonaqueous electrolyte.

The ambient temperature molten salt (ionic melt) indicates compounds among organic salts made of combinations of organic cations and anions, which are able to exist in a liquid state at ambient temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

II. Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, and button-shaped. The container member may be appropriately selected depending on battery size and use of the battery.

III. Negative Electrode Terminal

The negative electrode terminal may be made of a material that is electrochemically stable at the Li insertion-extraction potential of the negative electrode active materials mentioned above, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

IV. Positive Electrode Terminal

The positive electrode terminal may be made of, for example, a material that is electrically stable in the potential range of 3 V to 4.5 V (vs. Li/Li$^+$) relative to the oxidation-reduction potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the third embodiment will be more concretely described with reference to the drawings.

Figure 5:
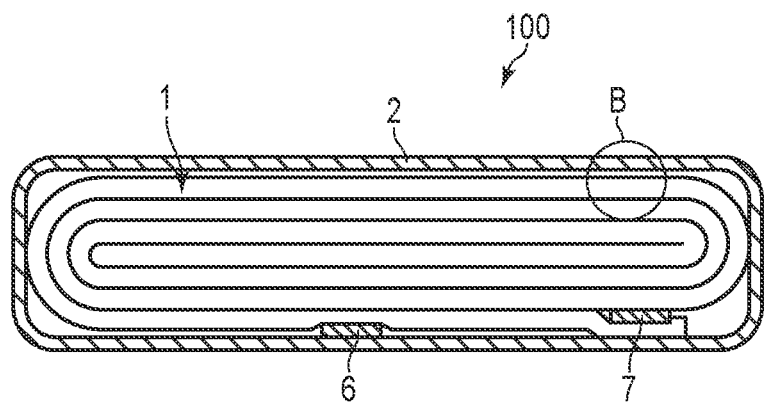
FIG. 5 is a cross-sectional view schematically showing an example of a secondary battery according to an embodiment.
Figure 6:
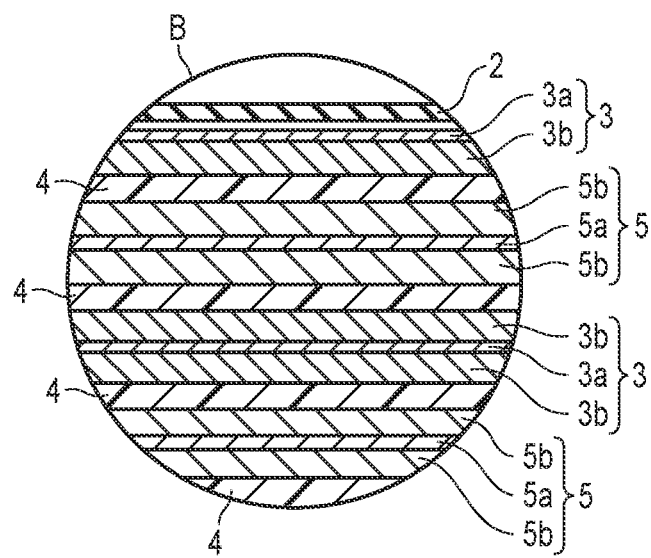
FIG. 6 is an enlarged cross-sectional view of section B of the secondary battery shown in FIG. 5.

FIG. 5 is a cross-sectional view schematically showing an example of a secondary battery according to the third embodiment. FIG. 6 is an enlarged cross-sectional view of section B of the secondary battery shown in FIG. 5.

The secondary battery 100 shown in FIGS. 5 and 6 includes a bag-shaped container member 2 shown in FIG. 5, an electrode group 1 shown in FIGS. 5 and 6, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 5, the electrode group 1 is a wound electrode group in a flat form. The wound electrode group 1 in a flat form includes a negative electrode 3, a separator 4, and a positive electrode 5, as shown in FIG. 6. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 6. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 5, a negative electrode terminal 6 and positive electrode terminal 7 are positioned in vicinity of the outer peripheral end of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

The secondary battery according to the third embodiment includes the electrode according to the second embodiment. Therefore, the secondary battery exhibits high capacity.

Fourth Embodiment

According to a fourth embodiment, a battery module is provided. The battery module according to the fourth embodiment includes plural of secondary batteries according to the third embodiment.

In the battery module according to the fourth embodiment, each of the single-batteries may be arranged to be electrically connected in series or in parallel, or may be arranged in combination of in-series connection and in-parallel connection.

An example of the battery module according to the fourth embodiment will be described next, with reference to the drawings.

Figure 7:
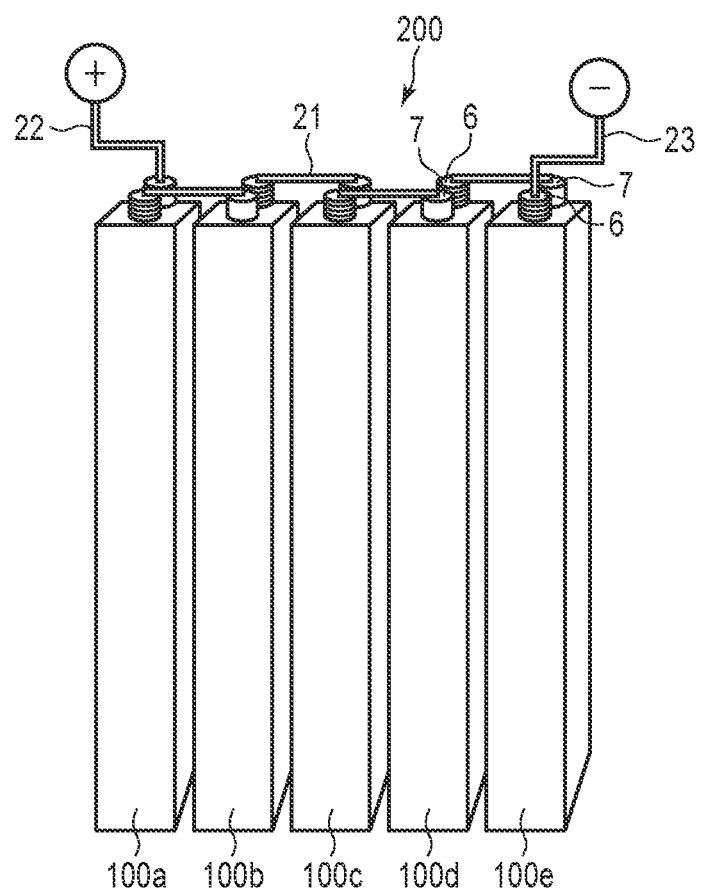
FIG. 7 is a perspective view schematically showing an example of a battery module according to an embodiment.

FIG. 7 is a perspective view schematically showing an example of the battery module according to the fourth embodiment. The battery module 200 shown in FIG. 7 includes five single-batteries 100a to 100e, four bus bars 21, a positive electrode-side lead 22, and a negative electrode-side lead 23. Each of the five single-batteries 100a to 100e is the secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 7 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the fourth embodiment includes the secondary battery according to the third embodiment. Therefore, the battery module exhibits high capacity.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the fifth embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 8:
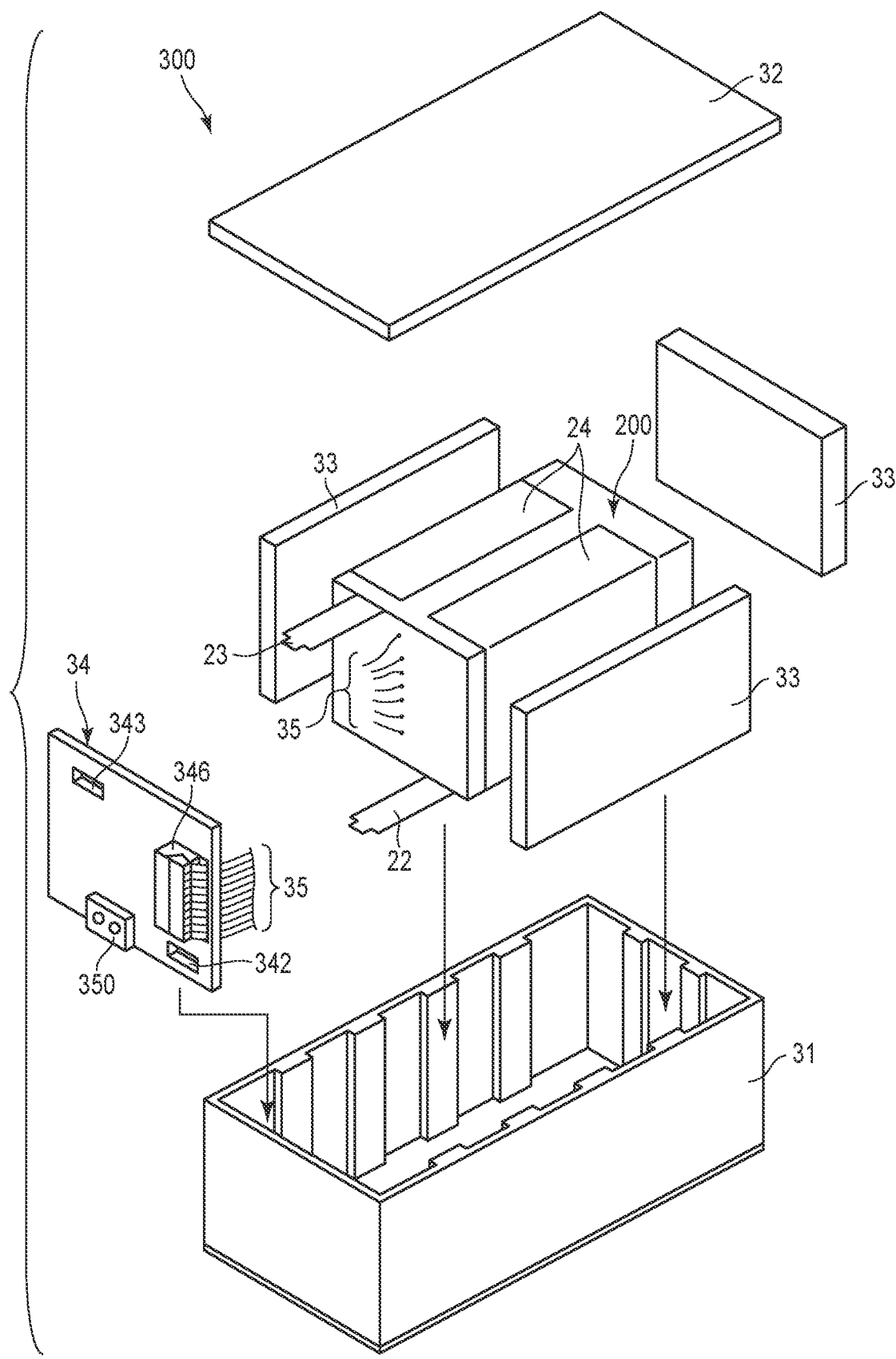
FIG. 8 is an exploded perspective view schematically showing an example of a battery pack according to an embodiment.
Figure 9:
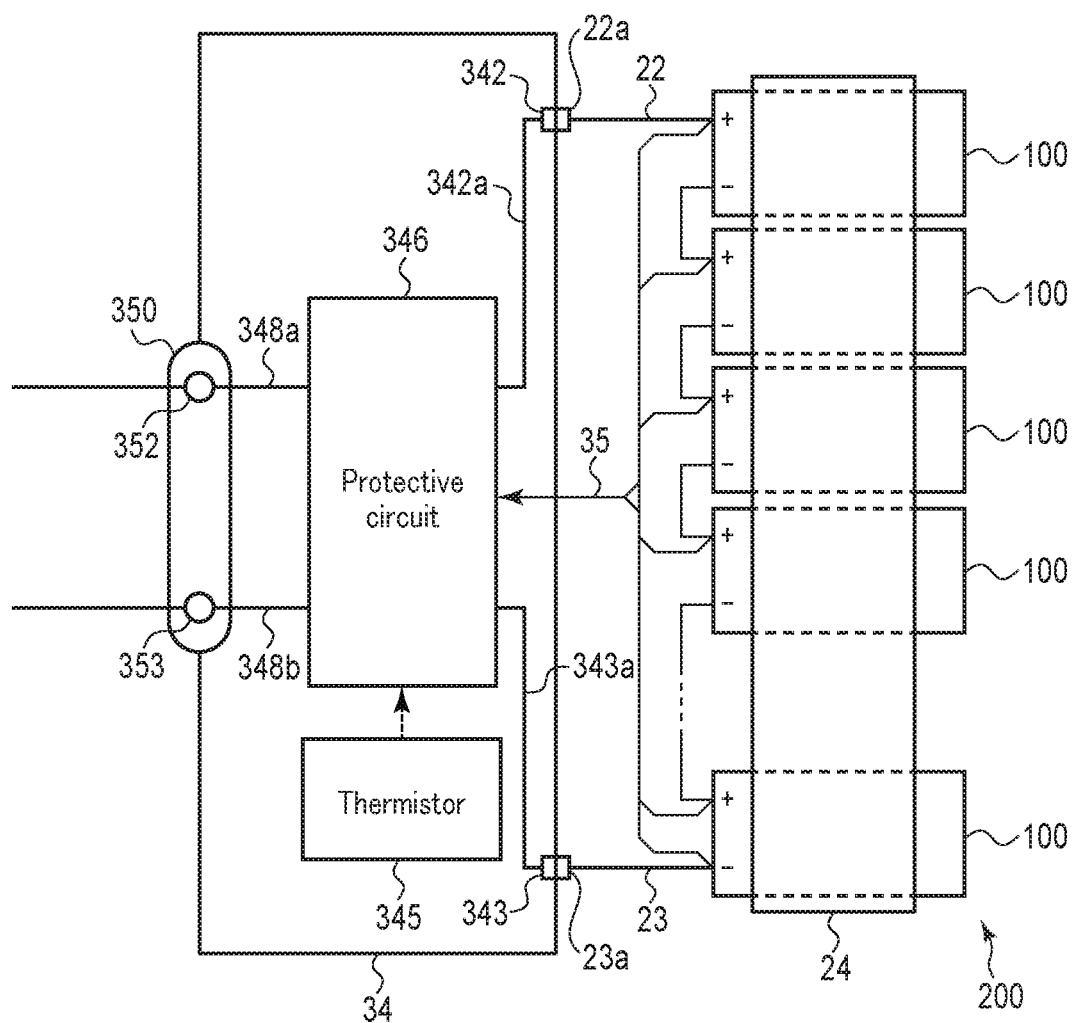
FIG. 9 is a block diagram showing an example of an electric circuit of the battery pack shown in FIG. 8.

FIG. 8 is an exploded perspective view schematically showing an example of the battery pack according to the fifth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the third embodiment. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal 352 and negative-side terminal 353 of the external power distribution terminal 350.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fifth embodiment is provided with the secondary battery according to the third embodiment or the battery module according to the fourth embodiment. Accordingly, the battery pack exhibits high capacity.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism (a regenerator) configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the sixth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the sixth embodiment is explained below, with reference to the drawings.

Figure 10:
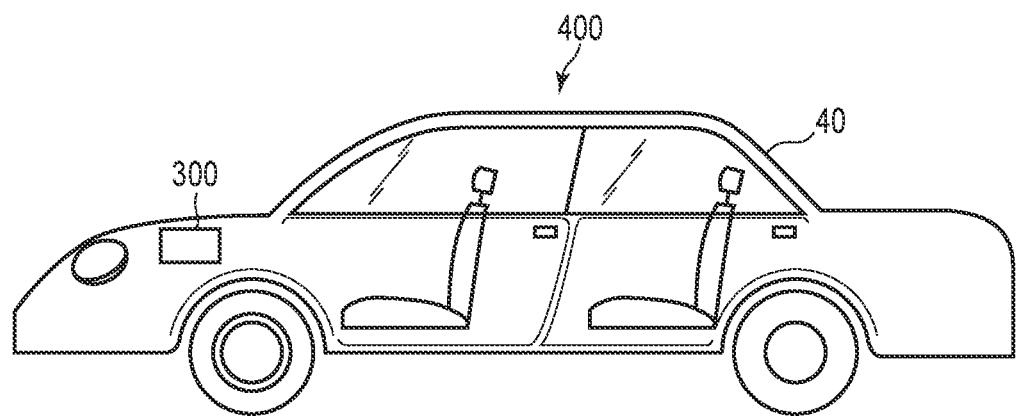
FIG. 10 is a partially see-through diagram schematically showing an example of a vehicle according to an embodiment.

FIG. 10 is a partially see-through diagram schematically showing an example of a vehicle according to the sixth embodiment.

A vehicle 400, shown in FIG. 10 includes a vehicle body 40 and a battery pack 300 according to the fifth embodiment. In the example shown in FIG. 10, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 10, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 11, an aspect of operation of the vehicle according to the sixth embodiment is explained.

FIG. 11 is a diagram schematically showing an example of a control system related to an electric system in the vehicle according to the sixth embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Thus, a vehicle of high performance can be provided.

EXAMPLES

Examples will be described hereinafter, but the embodiments are not limited to the examples described.

Example 1

<Electrode Fabrication>

First, for the positive electrode, 90% by mass of $LiMn_2O_4$ powder, 5% by mass of acetylene black, and 5% by mass of polyvinylidene fluoride (PVdF) were added to N-methylpyrrolidone (NMP) and mixed to prepare a slurry. For the negative electrode, 90 parts by mass of $Li_4Ti_5O_{12}$ having an average particle size of 3.0 μm, 5 parts by mass of acetylene black, 2 parts by mass of multi-walled carbon nanotube, and 3 parts by mass of PVdF were added to N-methylpyrrolidone and mixed to prepare a slurry. Each of the slurries for the positive and negative electrodes were respectively applied onto both faces of current collectors made of an aluminum foil having a thickness of 15 μm, at an application amount of 100 g/m². Each slurry coating film was dried, and then, pressed to prepare a positive electrode and a negative electrode. Note that each of the positive and negative electrodes was dried by blowing hot air at 130° C. from above and below each substrate.

<Fabrication of Laminate Cell>

The positive electrode, a separator made of a polyethylene porous film having a thickness of 25 μm, the negative electrode, and the separator were stacked in this order, and then, wound in a spiral shape. The resulting wound body was pressed at 40 kN for 10 seconds at ambient temperature (25° C.) to prepare a flat electrode group having a width of 30 mm, a height of 65 mm, and a thickness of 6.0 mm. The resulting electrode group was housed in a pack made of a laminate film and was subjected to vacuum drying at 80° C. for 24 hours. The laminate film was prepared by forming a polypropylene layer on both sides of an aluminum foil having a thickness of 40 μm. The laminate film had an overall thickness of 0.1 mm. To a mixed solution containing propylene carbonate (PC), diethyl carbonate (DEC), and methyl ethyl carbonate (MEC) at a volume ratio of 1:1:1, $LiPF_6$ was dissolved at a concentration of 1.0 M so as to prepare a liquid electrolyte. The liquid nonaqueous electrolyte (1.0 M $LiPF_6$; PC:DEC:MEC=1:1:1 (vol %)) was put into the pack of laminate film housing the electrode group. After that, the pack was completely sealed by heat sealing, thereby producing a nonaqueous electrolyte battery (laminate cell) having a width of 35 mm, a thickness of 6.2 mm, and a capacity of 5 Ah.

Example 2

A nonaqueous electrolyte battery was produced in a similar manner to Example 1 except that $TiNb_2O_7$ having an average particle size of 2.0 μm was used instead of $Li_4Ti_5O_{12}$ as the negative electrode active material.

Example 3

A nonaqueous electrolyte battery was produced in a similar manner as Example 1 except for the following points: $TiNb_2O_7$ having an average particle size of 2.0 μm was used as the negative electrode active material in place of $Li_4Ti_5O_{12}$; 1.5 parts by mass of carboxymethyl cellulose (CMC) and 1.5 parts by mass of styrene-butadiene rubber (SBR) were used instead of PVdF; water was used as the slurry solvent instead of NMP; and the drying temperature of the electrodes was changed to 110° C.

Example 4

A nonaqueous electrolyte battery was produced in a similar manner as Example 1 except that $TiNb_2O_7$ having an average particle size of 0.5 μm was used in place of $Li_4Ti_5O_{12}$ as the negative electrode active material.

Example 5

A nonaqueous electrolyte battery was produced in a similar manner as Example 1 except that $TiNb_2O_7$ having an average particle size of 3.0 μm was used in place of $Li_4Ti_5O_{12}$ as the negative electrode active material.

Example 6

A nonaqueous electrolyte battery was produced in a similar manner as Example 2 except that the wound body was pressed at 80° C. instead of ambient temperature.

Comparative Example 1

A nonaqueous electrolyte battery was produced in a similar manner as Example 1 except that the slurry composition for the negative electrode was changed to 90 parts by mass of $Li_4Ti_5O_{12}$ having an average particle size of 3.0 μm, 2 parts by mass of acetylene black, and 8 parts by mass of PVdF.

Comparative Example 2

A nonaqueous electrolyte battery was produced in a similar manner as Example 1 except that the slurry composition for the negative electrode was changed to 90 parts by mass of $Li_4Ti_5O_{12}$ having an average particle size of 3.0 μm, 8 parts by mass of acetylene black, and 2 parts by mass of PVdF.

Comparative Example 3

A nonaqueous electrolyte battery was produced in a similar manner as Example 1 except for the following points: the slurry composition for the negative electrode was changed to 90 parts by mass of $TiNb_2O_7$ having an average particle size of 2.0 μm, 7 parts by mass of acetylene black, 1.5 parts by mass of CMC, and 1.5 parts by mass of SBR; water was used as the slurry solvent instead of NMP; and the drying temperature of the electrodes was changed to 110° C.

Comparative Example 4

A nonaqueous electrolyte battery was produced in a similar manner as Example 1 except for the following points: the slurry composition for the negative electrode was changed to 90 parts by mass of $TiNb_2O_7$ having an average particle size of 2.0 μm, 4 parts by mass of acetylene black, 2 parts by mass of multi-walled carbon nanotubes, and 2 parts by mass each of CMC and SBR; water was used as the slurry solvent instead of NMP; and the drying temperature of the electrodes was changed to 110° C.

Comparative Example 5

A nonaqueous electrolyte battery was produced in a similar manner as Example 4 except that the drying temperature of the electrodes was changed to 200° C.

Tables 1 and 2 summarize details on the production of the laminate cells in Examples 1 to 6 and Comparative Examples 1 to 5. Specifically, details of the negative electrodes are listed in Table 1, and the production conditions of the electrode groups are listed in Table 2. In regard to details of each negative electrode, Table 1 shows the composition, average particle size, and content of the negative electrode active material, the material species of the electro-conductive agent and content thereof, the material species of the binder and content thereof, as well as the drying temperature of the slurry. In regard to each electro-conductive agent shown in Table 1, acetylene black and multi-walled carbon nanotube are referred to as "AB" and "MWCNT," respectively. Furthermore, in regard to each binder, polyvinylidene fluoride, carboxymethyl cellulose, and styrene-butadiene rubber are referred to as "PVdF," "CMC," and "SBR," respectively. In regard to the production conditions of each electrode group, Table 2 shows the pressing temperature, the load at the time of pressing, and the duration of pressing the wound body including the negative electrode, the positive electrode, and the separators.

electrode area at the time of preparing the negative electrode was calculated as an effective electrode area ratio by the aforementioned method.

<Peel Strength Test>

The negative electrode was separated from each unwound electrode group. From each negative electrode, a 5 cm square test piece was cut out from a part corresponding to a flat section of the electrode group when the electrode group had been wound. The test piece cut out from each negative electrode was immersed in a mixed solvent of diethyl carbonate and propylene carbonate for 5 minutes, and then, subjected to vacuum drying under a pressure of −96 kPa for about 10 minutes. Flat pressing was perpendicularly performed on each test piece for 30 seconds under a load of 20 kN, and a blower was used to blow off peeled portions of the active material-containing layer to prepare a sample.

Each resulting sample was used to measure a peel strength between the current collector and the active material-containing layer by the surface/interfacial cutting method (SA-ICAS method) described above.

<Determination of Unbound Ratio>

From each separated negative electrode, a 5 cm square test piece was cut out centered on the bent portion closest to the innermost end of the electrode group when the electrode group had been wound. The test piece cut out from each negative electrode was immersed in a mixed solvent of diethyl carbonate and propylene carbonate for 5 minutes, and then, subjected to vacuum drying under a pressure condition of −96 kPa for about 10 minutes. Flat pressing was perpendicularly performed on each test piece for 30 seconds under a load of 20 kN, and a blower was used to blow off peeled portions of the active material-containing layer to prepare a sample.

In each resulting sample, an average value of both sides of the double-side coated negative electrode was used, and an image of the innermost bent section of the negative electrode was binarized with Image J by the aforementioned method so as to calculate an unbound ratio.

TABLE 1

|  | Negative Electrode Active Material | | | Electro-conductive Agent | | Binder | | |
| --- | --- | --- | --- | --- | --- | --- | --- | --- |
|  | Composition | Average Particle Size (μm) | Content (parts by mass) | Material Species | Content (parts by mass) | Material Species | Content (parts by mass) | Drying Temperature (° C.) |
| Example 1 | $Li_4Ti_5O_{12}$ | 3.0 | 90 | AB MWCNT | 5 2 | PVdF | 3 | 130 |
| Example 2 | $TiNb_2O_7$ | 2.0 | 90 | AB MWCNT | 5 2 | PVdF | 3 | 130 |
| Example 3 | $TiNb_2O_7$ | 2.0 | 90 | AB MWCNT | 5 2 | CMC SBR | 1.5 1.5 | 110 |
| Example 4 | $TiNb_2O_7$ | 0.5 | 90 | AB MWCNT | 5 2 | PVdF | 3 | 130 |
| Example 5 | $TiNb_2O_7$ | 3.0 | 90 | AB MWCNT | 5 2 | PVdF | 3 | 130 |
| Example 6 | $TiNb_2O_7$ | 2.0 | 90 | AB MWCNT | 5 2 | PVdF | 3 | 130 |
| Comparative Example 1 | $Li_4Ti_5O_{12}$ | 3.0 | 90 | AB | 2 | PVdF | 8 | 130 |
| Comparative Example 2 | $Li_4Ti_5O_{12}$ | 3.0 | 90 | AB | 8 | PVdF | 2 | 130 |
| Comparative Example 3 | $TiNb_2O_7$ | 2.0 | 90 | AB | 7 | CMC SBR | 1.5 1.5 | 110 |
| Comparative Example 4 | $TiNb_2O_7$ | 2.0 | 90 | AB MWCNT | 4 2 | CMC SBR | 2 2 | 110 |
| Comparative Example 5 | $TiNb_2O_7$ | 0.5 | 90 | AB MWCNT | 5 2 | PVdF | 3 | 200 |

TABLE 2

| | Pressing of Wound Body | | |
| --- | --- | --- | --- |
| | Temperature | Load (kN) | Duration (sec) |
| Example 1 | Ambient Temperature | 40 | 10 |
| Example 2 | Ambient Temperature | 40 | 10 |
| Example 3 | Ambient Temperature | 40 | 10 |
| Example 4 | Ambient Temperature | 40 | 10 |
| Example 5 | Ambient Temperature | 40 | 10 |
| Example 6 | 80° C. | 40 | 10 |
| Comparative Example 1 | Ambient Temperature | 40 | 10 |
| Comparative Example 2 | Ambient Temperature | 40 | 10 |
| Comparative Example 3 | Ambient Temperature | 40 | 10 |
| Comparative Example 4 | Ambient Temperature | 40 | 10 |
| Comparative Example 5 | Ambient Temperature | 40 | 10 |

<Determination of Effective Electrode Area Ratio>

Each of the fabricated laminate cell was disassembled, and the electrode group was taken out. After each electrode group was washed with a mixed solvent of diethyl carbonate and propylene carbonate and dried under reduced pressure, each electrode group of wound structure was unwound to examine for the occurrence of cutting of the negative electrode at the innermost section and peeling of the active material-containing layer. When cutting of the electrode or peeling of the active material-containing layer was observed, a ratio between an effective electrode area that may contribute to charge and discharge and an effective <Charge and Discharge Test>

Each of the produced nonaqueous electrolyte battery was charged at a current of 0.5 A, with termination conditions set to a maximum voltage of 2.7 V and 20 hours of charging time. Then, each nonaqueous electrolyte battery was discharged with a current of 0.5 A. A ratio of the actual capacity to the design capacity of each battery was calculated.

Table 3 shows various measurement results for the laminate cells according to Examples 1 to 6 and Comparative Examples 1 to 5. Specifically, Table 3 shows the peel strength between the current collector and the active material-containing layer in each negative electrode, the unbound ratio in the bent portion at the innermost of each negative electrode, the effective electrode area ratio of each negative electrode, the state of each negative electrode, and the ratio of the actual capacity to the design capacity of each laminate cell. In regard to the state of each negative electrode, when the active material-containing layer was determined to be partially unbound, Table 3 indicates as such. The state of a negative electrode described as "cutting in inner section" indicates that the negative electrode had a cut at the foremost bent portion from the innermost end of the wound electrode group, where the cut spanned over both the current collector and the active material-containing layer, whereby a portion between the innermost bent section and the innermost end was cut off from the other portions. When a negative electrode was cut, even though some portions where the active material-containing layer was partially unbound had also been observed, the cutting of the negative electrode was prioritized, and thus, Table 3 indicates "cutting in inner section".

higher in effective electrode area ratio of the negative electrode and were also higher in actual capacity with respect to the design capacity.

In Comparative Example 1, an inner section of the negative electrode was cut, which resulted in a small effective electrode area of the negative electrode and a low actual capacity of the battery. In Comparative Example 1, the negative electrode not only had a high peel strength but also did not include any carbon nanotube as an electro-conductive agent. Accordingly, in Comparative Example 1, it is inferred that the negative electrode broke because the stiff negative electrode active material-containing layer could not separate from the current collector.

In each of Comparative Examples 2 and 3, although the electrode was not cut, there was much peeling of the negative electrode active material-containing layer from the negative electrode current collector, which resulted in the effective electrode area of the negative electrode and actual capacity of the battery being somewhat low. In each of Comparative Examples 2 and 3, the negative electrode had exhibited the same degree of peel strength as the negative electrodes in Examples 1 to 6. Despite this fact, the reason there was much peeling of the active material-containing layer in each of Comparative Examples 2 and 3 is inferred as being due to both of the active material-containing layers not having included any carbon nanotube, which made the layers inflexible.

In Comparative Example 4, an inner section of the negative electrode was cut off, which resulted in a small effective electrode area of the negative electrode and a low actual

TABLE 3

|  | Peel Strength in Negative Electrode (kN/m) | Unbound Ratio in Innermost Bent Portion in Negative Electrode (%) | Effective Electrode Area Ratio of Negative Electrode (%) | State of Negative Electrode | Actual Capacity/ Design Capacity Ratio (%) |
|---|---|---|---|---|---|
| Example 1 | 0.65 | 3.3 | 98.6 | A part in active material-containing layer in unbound state | 99 |
| Example 2 | 0.61 | 4.5 | 98.2 | A part in active material-containing layer in unbound state | 98.7 |
| Example 3 | 0.52 | 2.2 | 99 | A part in active material-containing layer in unbound state | 99 |
| Example 4 | 0.33 | 8.0 | 97 | A part in active material-containing layer in unbound state | 98 |
| Example 5 | 0.44 | 3.5 | 98.1 | A part in active material-containing layer in unbound state | 99 |
| Example 6 | 0.61 | 5.5 | 98.1 | A part in active material-containing layer in unbound state | 98.2 |
| Comparative Example 1 | 1.44 | 1.4 | 84.5 | Cutting in inner sections | 86.1 |
| Comparative Example 2 | 0.62 | 25.2 | 94.2 | A part in active material-containing layer in unbound state | 94.3 |
| Comparative Example 3 | 0.65 | 35.8 | 92 | A part in active material-containing layer in unbound state | 93.5 |
| Comparative Example 4 | 1.25 | 0.5 | 85 | Cutting in inner sections | 86 |
| Comparative Example 5 | 0.15 | 18.8 | 92 | A part in active material-containing layer in unbound state | 84.2 |

As shown in Table 3, in Examples 1 to 6, the peel strength in each negative electrode fell within a range from 0.2 kN/m to 0.7 kN/m. In each of the laminate cells including these negative electrodes, the unbound ratio of the active material-containing layer at the innermost bent section of the negative electrode fell within a range from 1% to 20%. Comparing the laminate cells in Examples 1 to 6 with the laminate cells in Comparative Examples 1 to 5, the former cells were capacity of the battery. In Comparative Example 4, although the carbon nanotube was included in the active material-containing layer, the active material-containing layer had a high peel strength with respect to the current collector. In Comparative Example 4, it is inferred that the negative electrode broke because the stiff negative electrode active material-containing layer could not separate from the current collector.

In Comparative Example 5, the negative electrode had a low effective electrode area and a somewhat low actual capacity of the battery. In Comparative Example 5, the negative electrode had a low peel strength. Although the active material-containing layer at the innermost bent section of the negative electrode had a somewhat high unbound ratio, the unbound ratio fell within a range from 1% to 20%. Despite the low unbound ratio in the innermost bent section of the negative electrode, the reason the actual capacity of the laminate cell according to Comparative Example 5 decreased is inferred to be due to the negative electrode as a whole having a low peel strength, which caused peeling of the active material-containing layer at locations other than innermost portions and the bent portions in the negative electrode.

According to one or more embodiment and example explained above, an electrode is provided. The electrode includes a current collector and an active material-containing layer in contact with the current collector. The active material-containing layer contains titanium-containing oxide as active material and carbon nanotubes as electro-conductive agent. The titanium-containing oxide has a form of particles having an average particle size of 0.1 μm to 3 μm. A peel strength of the active material-containing layer with respect to the current collector is within a range of 0.2 kN/m to 0.7 kN/m. When used in a wound electrode, the electrode can suppress cutting and cracking at inner sections of the electrode group. Since the electrode can prevent decrease of battery performance caused by such cutting and cracking, the electrode can allow a battery including the wound electrode group to exhibit its true battery performance, thereby improving battery capacity. In addition, the electrode can provide an electrode group that can improve the capacity of a secondary battery, a secondary battery and battery pack with improved capacity, and a vehicle having the battery pack installed thereon.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An electrode group comprising:
   a positive electrode; and
   a negative electrode,
   the electrode group having a wound structure of a flat shape where a stack comprising the positive electrode and the negative electrode is wound in a manner where a center of the wound structure lies along a first direction,
   wherein the negative electrode comprises:
   a current collector; and
   an active material-containing layer in contact with the current collector, the active material-containing layer comprising a carbon nanotube and titanium-containing oxide particles having an average particle size of 0.1 μm to 3 μm,
   a peel strength between the current collector and the active material-containing layer according to a surface/interface cutting method is from 0.2 kN/m to 0.7 kN/m, and
   a part of the active material-containing layer of the negative electrode is in an unbound state with respect to the current collector at an innermost bent section positioned innermost in the wound structure, the unbound state being a state where an interspace is present between the current collector and the active material-containing layer or where the current collector and the active material-containing layer are in contact with each other but not bound to each other.

2. The electrode group according to claim 1, wherein for the active material-containing layer in the innermost bent section, an unbound ratio is from 1% to 20% per unit area of a width of 1 cm and a height of 5 cm, centered on the innermost bent section, where the unbound ratio is an area ratio of an area of a portion where the active material-containing layer is unbound to a total area of the unit area.

3. The electrode group according to claim 1, wherein the titanium-containing oxide comprises one or more selected from the group consisting of lithium titanate having a spinel structure; monoclinic titanium dioxide; orthorhombic titanium-containing composite oxide represented by $Li_{2+a}M\alpha_{2-b}Ti_{6-c}M\beta_d O_{14+\sigma}$ where $M\alpha$ is at least one selected from the group consisting of Sr, Ba, Ca, Mg, Na, Cs, Rb and K, $M\beta$ is at least one selected from the group consisting of Zr, Sn, V, Nb, Ta, Mo, W, Y, Fe, Co, Cr, Mn, Ni and Al, $0 \leq a \leq 6$, $0 \leq b < 2$, $0 \leq c < 6$, $0 \leq d < 6$, and $-0.5 \leq \sigma < 0.5$; and monoclinic niobium-titanium composite oxide represented by $Li_x Ti_{1-y} M1_{y+z} Nb_{2-z} O_{7-\delta}$ where, M1 is at least one selected from the group consisting of Mg, Fe, Ni, Co, W, Ta, and Mo, $0 \leq x \leq 5$, $0 \leq y < 1$, $0 \leq z < 2$, and $-0.3 \leq \delta \leq 0.3$.

4. The electrode group according to claim 1, wherein the current collector is made of copper, nickel, stainless steel, aluminum, or an aluminum alloy including one or more selected from the group consisting of Mg, Ti, Zn, Mn, Fe, Cu, and Si.

5. The electrode group according to claim 1, wherein the active material-containing layer contains an electro-conductive agent comprising the carbon nanotube or the carbon nanotube and one or more selected from the group consisting of vapor grown carbon fiber, acetylene black, and graphite.

6. The electrode group according to claim 1, wherein the active material-containing layer further contains one or more binder selected from the group of polytetrafluoroethylene, polyvinylidene fluoride, fluororubber, styrene-butadiene rubber, polyacrylate compounds, imide compounds, carboxymethyl cellulose, and salts of carboxymethyl cellulose.

7. The electrode group according to claim 1, wherein the active material-containing layer contains an active material comprising the titanium-containing oxide, an electro-conductive agent comprising the carbon nanotube, and a binder, and the active material-containing layer contains the active material in a proportion of 70% by mass to 96% by mass to the active material-containing layer, the electro-conductive agent in a proportion of 2% by mass to 28% by mass to the active material-containing layer, and the binder in a proportion of 2% by mass to 10% by mass to the active material-containing layer.

8. A secondary battery comprising:
   the electrode group according to claim 1; and
   an electrolyte.

9. A battery pack comprising the secondary battery according to claim 8.

10. The battery pack according to claim 9, further comprising an external power distribution terminal and a protective circuit.

11. The battery pack according to claim 9, comprising plural of the secondary battery, the secondary batteries being electrically connected in series, in parallel, or in combination of in-series connection and in-parallel connection.

12. A vehicle comprising the battery pack according to claim 9.

13. The vehicle according to claim 12, wherein the vehicle comprises a mechanism configured to convert kinetic energy of the vehicle into regenerative energy.

* * * * *